United States Patent [19]
Putnam

[11] 4,082,454
[45] Apr. 4, 1978

[54] MODULAR MICROFICHE DUPLICATOR

[75] Inventor: Dean H. Putnam, Toledo, Ohio

[73] Assignee: Magnagard Equipment & Manufacturing Corporation, Toledo, Ohio

[21] Appl. No.: 587,082

[22] Filed: Jun. 16, 1975

[51] Int. Cl.² ............................................. G03B 27/04
[52] U.S. Cl. ....................................... 355/99; 355/78; 355/97
[58] Field of Search ........................ 355/91, 92, 97, 99, 355/78, 100

[56] References Cited

U.S. PATENT DOCUMENTS

| | | | |
|---|---|---|---|
| 2,548,998 | 4/1951 | Oakhill | 355/97 |
| 3,320,867 | 5/1967 | Miller | 355/92 |
| 3,409,364 | 11/1968 | Moorhusen | 355/92 |
| 3,689,154 | 9/1972 | Swain et al. | 355/92 X |
| 3,867,031 | 2/1975 | Hakanson | 355/99 X |

*Primary Examiner*—Fred L. Braun
*Attorney, Agent, or Firm*—Donald R. Fraser

[57] ABSTRACT

A modular microfiche duplicator including a basic processing module which co-operates with a selected one of a plurality of different film advancing modules. In the basic processing module, the unexposed film is taken from a supply reel in a continuous strip and is drawn through an exposure station in metered segments. The microfiche sheet which is to be duplicated is inserted into the exposure station and an inflated air bag platen presses the films together as they are exposed to radiation from a columnar light source. The exposed segment of the film is then drawn into a film advancing module as the strip of film is advanced to the next segment.

4 Claims, 10 Drawing Figures

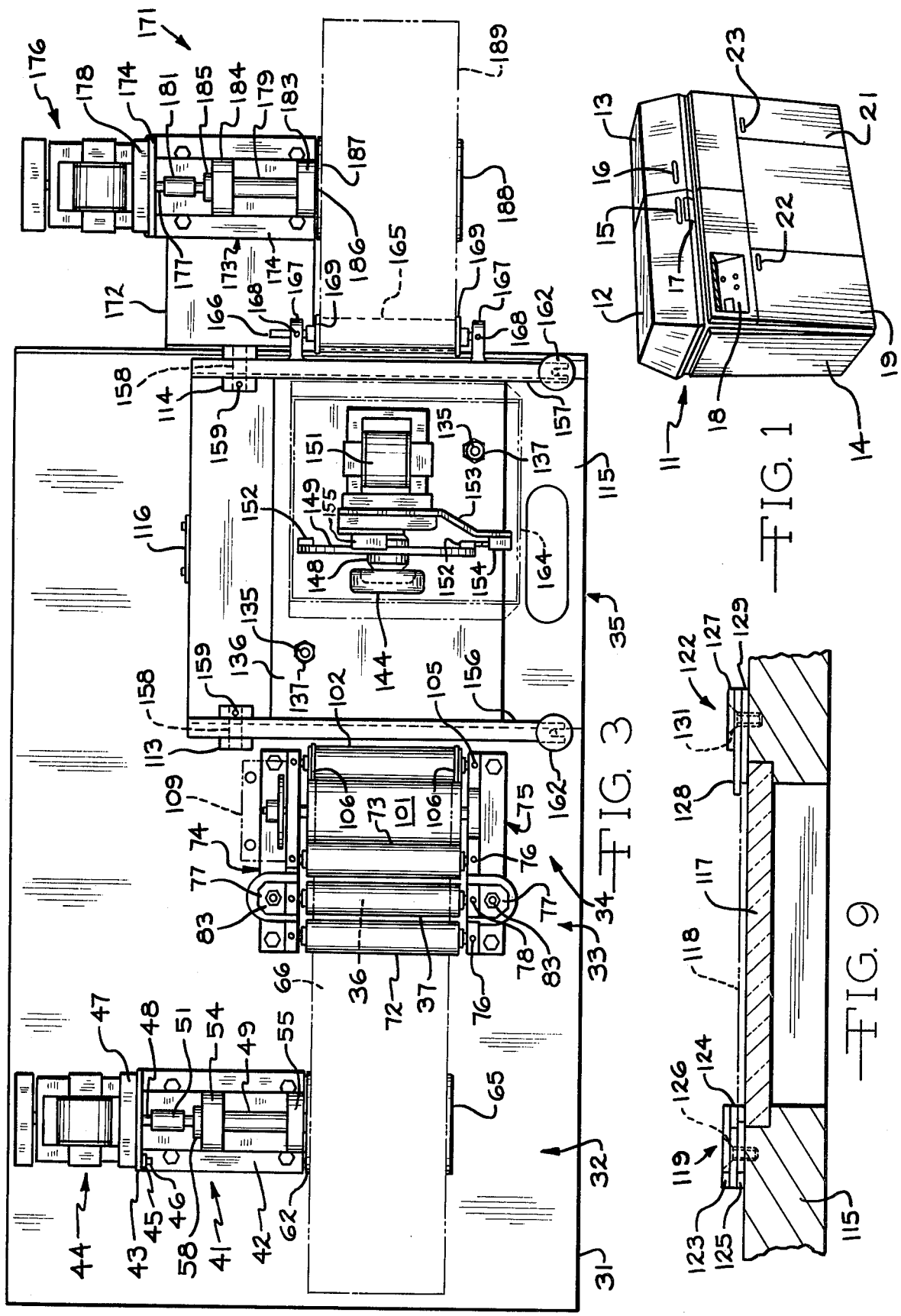

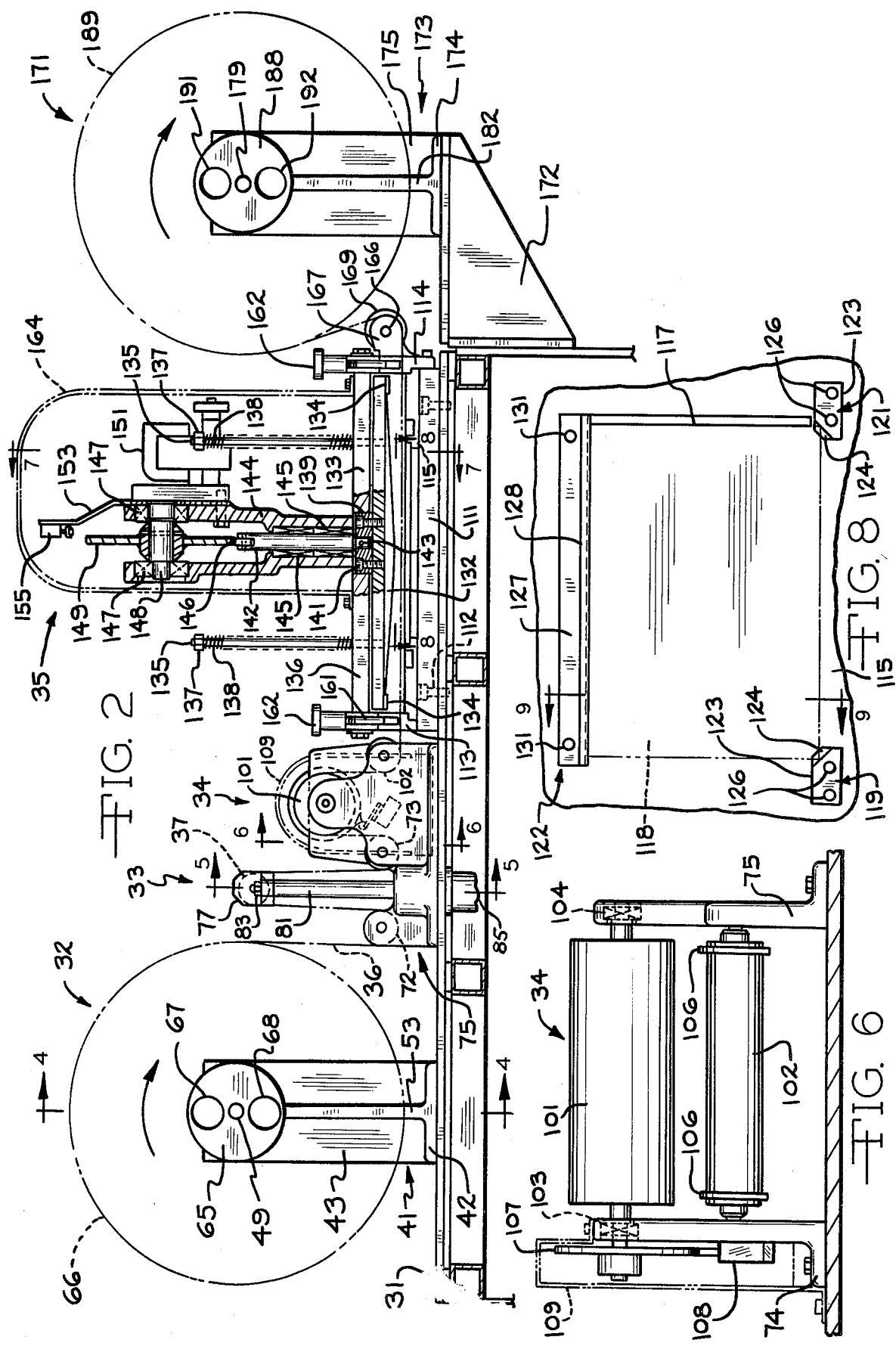

MODULAR MICROFICHE DUPLICATOR

CROSS-REFERENCE TO RELATED APPLICATION

The basic processing module of the present invention may be utilized with the film advancing module disclosed in a co-pending patent application, Ser. No. 597,443, filed July 12, 1975, now U.S. Pat. No. 4,013,363, and entitled "VESICULAR FILM ADVANCING MODULE" which is assigned to the assignee of the present invention.

BACKGROUND OF THE INVENTION

1. Field of the Invention

This invention relates in general to a microfiche processing apparatus and in particular to a modular processing apparatus comprising a basic processing module which co-operates with one of several different film advancing modules for processing various types of microfilm.

2. Description of the Prior Art

One form of microfilm is microfiche which is generally known as a group of related images arranged on a card-like transparent sheet of film. Typically, these sheets measure 105 mm by 148 mm and are unmounted. The wide-spread use of microfiche has led to a demand for a means of duplicating the microfiche. However, the use of three major types of duplicating film, silver film, diazo film and vesicular film, requires the utilization of three different developing processes with their associated developing apparatus.

Early microfiche copiers generally comprised two separate machines. In one machine, the master microfiche was exposed in juxtaposition with the copy film. Then the exposed copy film was transferred to a separate developing machine. Although this operation only required one exposure machine and three different developers to handle the three types of film, the manual labor involved in transferring the exposed film to the proper development machine was costly.

Other early attempts combined the exposure and development functions for each type of film in a separate machine. However, this required a substantial investment since three different machines were needed to develop the three types of film and two extra exposure machines were included.

An attempt to reduce the previously mentioned costs produced the microfiche duplicator disclosed in U.S. Pat. No. 3,836,252 issued Sept. 17, 1974. This duplicator combined in a single machine one exposure station and separate diazo and vesicular film developing means. However, this machine was limited in flexibility since only two of the three basic types of film could be developed and it was difficult to add means for developing any other type of film. Furthermore, this machine was more expensive than a duplicator for only one type of film where the capability for duplicating the other type of film was not required.

SUMMARY OF THE INVENTION

The present invention relates to a modular microfiche duplicator comprising a basic processing module which co-operates with a selected one of a number of different film advancing modules. The basic processing module includes a roll of unexposed film wound on a supply reel. The film is drawn from the supply reel in a continuous strip and is moved through a exposure station in metered segments. The microfiche sheet which is to be duplicated is inserted into the exposure station between the unexposed film and a transparent plate. An inflated air bag disposed above the unexposed film is utilized to press the film and the fiche together as they are exposed to radiant energy from a columnar light source located below the transparent plate. The air bag is raised to release the exposed film which is then moved into an advancing module as the strip of film is incrementally advanced.

Also disclosed in this application is a silver film advancing module for use with the basic processing module. The silver film advancing module comprises a take-up roll for rewinding the exposed film which is then taken to a separate developing machine. A vesicular film advancing module, as disclosed in co-pending patent application, Ser. No. 597,443, filed July 12, 1975, and entitled "VESICULAR FILM ADVANCING MODULE," may also be utilized with the basic processing module to cut, develop and collect the exposed film. Other developing modules for different types of films may be easily connected to the basic processing module.

It is an object of the present invention to automatically duplicate a master microfiche on a selected one of a plurality of different types of microfilm.

It is another object of the present invention to duplicate one or more master microfiches on a continuous strip of microfilm in a basic processing module.

It is a further object of the present invention to supply a continuous strip of exposed microfilm to a selected one of a plurality of advancing modules according to the type of film to be processed.

It is another object of the present invention to provide a module microfiche duplicator for processing and developing different types of microfilm at a minimum investment in duplicating equipment.

BRIEF DESCRIPTION OF THE DRAWINGS

FIG. 1 is a perspective view of a modular microfiche duplicator according to the present invention;

FIG. 2 is a fragmentary front elevational view of the basic processing module and the silver film advancing module of the duplicator of FIG. 1 with the lower portion of the duplicator and certain conventional auxiliary equipment omitted;

FIG. 3 is a plan view of the basic processing module and silver film advancing module of FIG. 2;

FIG. 6 is a cross-sectional view of the film metering station of FIG. 2 taken along the line 6—6;

FIG. 8 is a cross-sectional view of the slide plate of FIG. 2 taken along the line 8—8;

FIG. 9 is a cross-sectional view of the slide plate of FIG. 8 taken along the line 9—9.

DESCRIPTION OF THE PREFERRED EMBODIMENT

Figure 4:
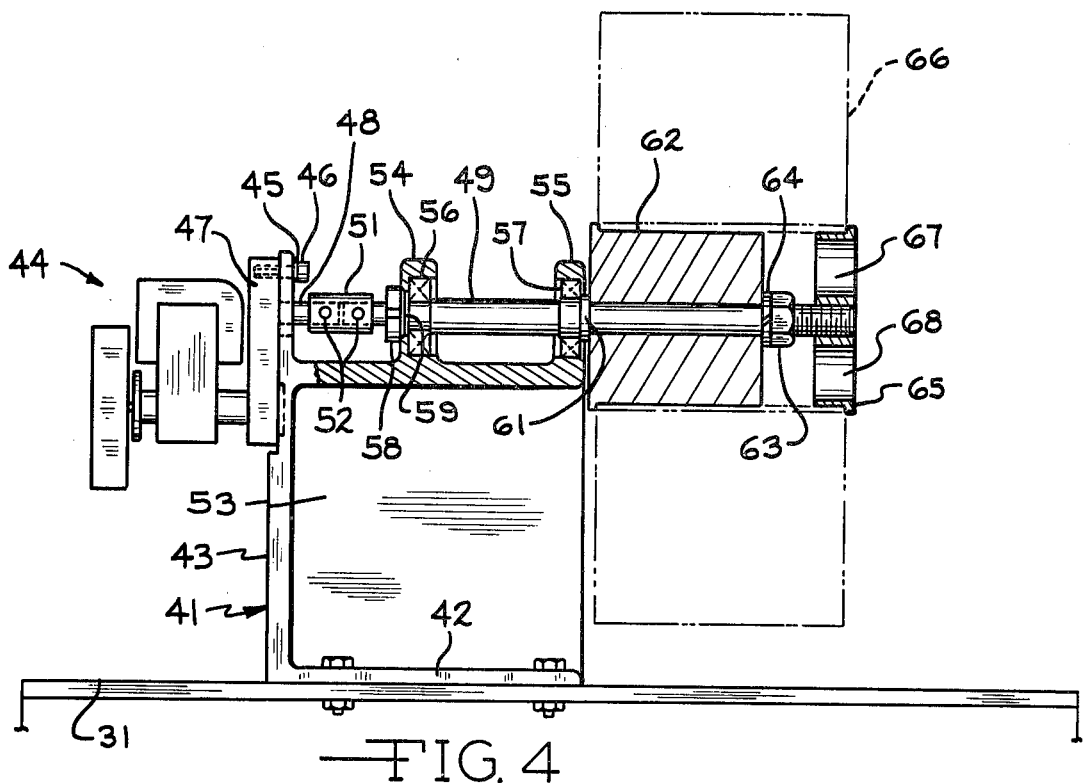
FIG. 4 is a cross-sectional view of the film supply station of FIG. 2 taken along the line 4—4.

Referring to FIG. 1, there is shown in a perspective view a modular microfiche duplicator, according to the present invention, housed in a cabinet generally designated by reference numeral 11. The cabinet 11 includes a basic processing module cover 12 and a film advancing module cover 13 mounted atop a base 14. Both covers 12 and 13 are hingedly attached to the base 14 along the rear edge thereof. Recessed handles 15 and 16 are formed in the front surfaces of the covers 12 and 13 respectively so that the covers can be raised to reveal the basic processing module and the film advancing module. An aperture 17 is formed in the front surface of the cover 12 for inserting and retrieving the master microfiche from the basic processing module.

The base 14 includes a base frame (not shown) covered by the external panels which co-operate with the covers 12 and 13 to shield the mechanisms of the duplicator from view and to provide a pleasing appearance. A recessed control panel 18, from which the functions of the duplicator can be controlled, is located in the front surface of the base 14 adjacent to the cover 12. A pair of doors 19 and 21 are hingedly attached to the base 14, one at either end thereof, and can be opened utilizing a pair of recessed handles 22 and 23 formed in the front surfaces of the doors 19 and 21 respectively, to reveal storage areas in the base 14.

The film advancing module under the cover 13 may be one of three different types. A silver film module, which is illustrated in this application, may be utilized to collect the exposed silver film microfiche duplicates for further processing outside the duplicator. A vesicular film module, disclosed in application Ser. No. 597,443, which is assigned to the assignee of the present invention, and incorporated by a reference herein, may be utilized to develop and collect exposed vesicular film microfiche duplicates. A diazo film module, disclosed in application Ser. No. 617,595, filed Sept. 29, 1975, which is assigned to the assignee of the present invention and incorporated by reference herein, may be utilized to develop and collect exposed diazo film microfiche duplicates.

FIG. 2 is a fragmentary front elevational view and FIG. 3 is a plan view of the basic processing module and silver film module according to the present invention. The silver film module draws the film through the basic processing module and collects the exposed film. A base plate 31 is supported by the frame of the base 14 which may be constructed from metal tubing having a square cross-section. Mounted on the upper surface of the base plate 31 is a film supply station 32, a film feed station 33, a film metering station 34, and a film exposure station 35. A reel of unexpected film (shown in phantom) is rotatably mounted at the supply station 32 to provide a continuous strip of film 36 (shown in phantom) to the film exposure station 35. When it is desired to make a duplicate of an original or master microfiche, the master microfiche is inserted into the exposure station 35 beneath an unexposed segment of the continuous strip of film. The unexposed film segment and the master microfiche are pressed together and exposed to radiation from a light source. The master microfiche may be left in place to make a second duplicate or another master microfiche may be substituted in its place. The film metering station 34 then measures the advance of the continuous strip of film and stops the advance at the length of the now exposed segment to bring another unexposed segment into registration with the master microfiche in the film exposure station 35.

A film feed roller 37 is mounted for vertical movement in the film feed station 33. The film roller 37 moves upwardly until stopped at an upper limit position to draw a predetermined length of the continuous strip of the film 36 from the reel at the film supply station 32. The film metering station 34 meters the predetermined length of film into the film exposure station 35, in segments equal in length to the master microfiche, as the silver film module draws the strip of film through the basic processing module. The metered advance progressively pulls the film feed roller 37 downwardly to a lower limit. When the feed roller 37 reaches the lower limit, the film feed station 33 is activated to move the feed roller 37 upwardly to draw another predetermined length of the continuous strip of film 36 from the reel at the film supply station 32. The exposed film exits the film exposure station 35 and enters the silver film module where it is wound on a take-up reel as each segment passes through the film exposure station 35.

FIG. 4 shows a cross-sectional view of the film supply station 32 of the basic processing module taken along line 4—4 of FIG. 2. Referring to FIGS. 2, 3 and 4, there is shown a supply reel mounting bracket 41 having a planar lower base 42 which may be attached to the base plate 31 by any suitable means such as cap screws, lock washers and nuts as shown. There is formed along the rear edge of the lower base 42 a vertical planar plate 43 having a gear motor 44 attached to the rearward surface thereof. The gear motor 44 may be attached to the plate 43 by any suitable means such as cap screws and lock washers. Typically, a lock washer 45 is trapped between a head of a cap screw 46 and the plate 43. The cap screw body extends through the plate 43 and threadably engages a gear case 47 of the gear motor 44 to secure the gear motor to the plate 43.

The gear motor 44 has an output shaft 48 which exits the gear case 47 and extends through an aperture in the plate 43. The output shaft 48 is connected to a driveshaft 49 by a sleeve coupling 51. The coupling has a longitudinal aperture formed therein for receiving one end of each of the output shaft 48 and the driveshaft 49 which are retained by a pair of set screws 52 threaded axially into the coupling and tightened against a longitudinal flat on the end of each shaft. The gear motor also includes a magnetic brake which may be actuated to stop the rotation of the output shaft 48 to prevent overrunning of the supply reel.

There is also formed on the lower base 42 a vertical planar plate 53 which is attached to the plate 43 at right angles thereto. Formed on the upper edge of the plate 53 is a pair of bosses 54 and 55 which retain a pair of ball bearings 56 and 57 respectively. The driveshaft 49 is rotatably mounted by the ball bearings 56 and 57 and is restrained from axial movement therethrough. A bearing lock nut 58 threadably engages the driveshaft 49 adjacent the end connected to the coupling 51. A bearing lock washer 59 is trapped between the lock nut 58 and the rearward surface of the bearing 56 to prevent forward movement of the driveshaft 49. A collar 61 formed on the driveshaft 49 is drawn against the forward surface of the bearing 57 when the lock nut 58 is tightened to prevent rearward movement of the driveshaft 49.

The forward end of the driveshaft 49 is inserted into an axial aperture in a rear film hub 62. A nut 63 threadably engages the forward end of the driveshaft 49 and is tightened to trap the lock washer 64 and the film hub 62 against the collar 61 so that the hub 62 rotates with the driveshaft 49. The forward end of the driveshaft 49 is threaded into a front film hub 65. The rear film hub 62 has a flange formed on its rearward edge and the front film hub 65 has a flange formed on its forward edge for retaining a supply reel of film 66, shown in phantom. The reel 66 has a hollow core of a standard diameter for the microfilm industry into which the rear hub 62 is inserted until the reel 66 abuts the flange on the hub 62. Then the front hub 65 is inserted into the hollow core as it is threaded onto the shaft 49 until its flange abuts the reel 66. The front hub 65 is provided with a pair of diametrically opposed longitudinal apertures 67 and 68 which serve as finger grips for turning the front film hub 65.

Figure 5:
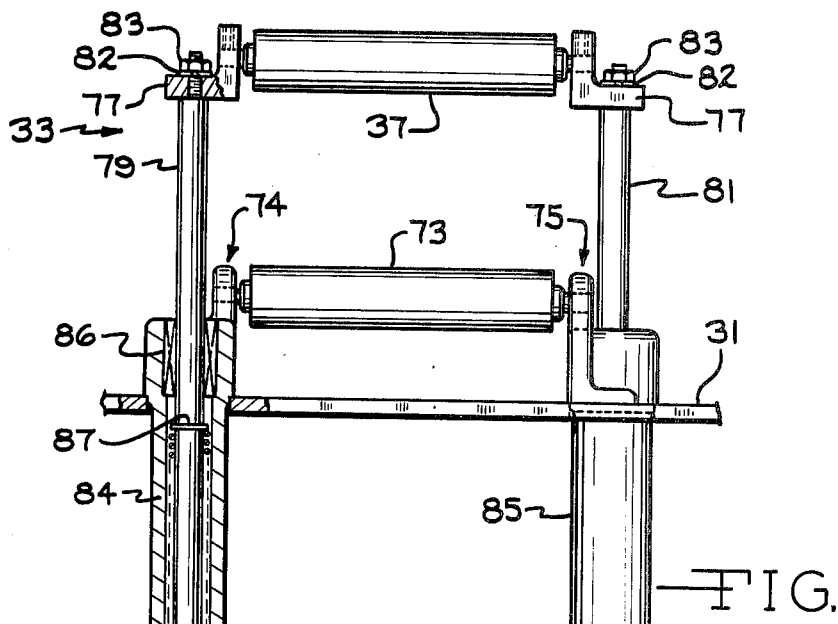
FIG. 5 is a cross-sectional view of the film feed station of FIG. 2 taken along the line 5—5.

FIG. 5 shows a cross-sectional view of the film feed station 33 of FIG. 2 taken along the line 5—5. As shown in FIG. 2, the gear motor 44 drives the supply reel 66 in a clockwise direction to unwind the film and supply a predetermined length of a continuous strip of film 36, shown in phantom, to the film feed station 33. Referring to FIGS. 2, 3 and 5, there is shown the feed station 33 which includes the film feed roller 37 positioned between a pair of co-operating rollers 72 and 73 which guide the strip of film 36. A pair of mounting brackets 74 and 75 are attached to the base plate 31 by any suitable means on each side of the path of travel of the strip of film 36. The rollers 72 and 73 are positioned and spaced apart in parallel relationship between the brackets 74 and 75 and are perpendicular to the path of travel of the film 36. The film feed roller 37 moves in a vertical plane between the rollers 72 and 73 when the strip of film enters or exits the film feed station 33.

Each of the rollers 72 and 73 is rotatably mounted on a shaft the opposite ends of which are inserted in apertures in the mounting brackets 74 and 75. The ends of the shaft are retained in the mounting bracket apertures by axially located set screws 76 threaded into the mounting brackets for frictionally engaging the outer surface of each shaft so that the rollers 72 and 73 are free to rotate on the shafts as the strip of film 36 enters or exits the film feed station 33. The path of travel of the strip of film 36 is from the supply reel 66, around the underside of the roller 72, around the upper side of the roller 37, around the underside of the roller 73 and into the film metering station.

The roller 37 is similar to the rollers 72 and 73 and is rotatably mounted on a shaft the opposite ends of which are inserted in apertures in a leg of each of a pair of right angle roller mounting brackets 77. The ends of the shaft are retained in the mounting bracket apertures by axially located set screws 78 threaded into the mounting brackets 77 for frictionally engaging the outer surface of the shafts so that the roller 37 is free to rotate as the strip of film 36 moves through the film feed station 33. The threaded upper ends of a guide shaft 79 and a guide shaft 81 extend through an aperture in the other legs of the mounting brackets 77 and receive a lock washer and a nut for securely attaching the brackets 77 thereto.

The mounting brackets 74 and 75 each have formed thereon a downwardly extending tubular leg 84 and 85 respectively, which extend through the base plate 31 into the area beneath the base 14 shown in FIG. 1 and accept the guide shafts 79 and 81 respectively. Since the internal construction of the legs 84 and 85 is the same, only the leg 84 will be discussed. A sleeve ball bearing 86 is press fitted into the upper end of the leg 84 to provide a bearing surface for the guide shaft 81 as it slides into and out of the hollow center of the leg 84 to raise and lower the film feed roller 37. Approximately at the longitudinal midpoint of the guide shaft 79 there is formed an axial groove which receives a C-shaped retaining ring 87. The lower end of the guide shaft 79 extends beyond the lower end of the leg 84 through an aperture in an end cap 88. The end cap may be attached to the leg 79 by any suitable means such as counter sunk flat head screws 89. The guide shaft 79 is inserted into the core of a helical spring 91 which is trapped inside the leg 84 between the retaining ring 87 and the end cap 88. A downward force applied to the roller 37 will cause the guide shafts 79 and 81 to move downwardly thereby compressing their associated springs. When the downward force is removed, the compressed springs force the guide shafts 79 and 81 and the roller 37 upwardly.

The end cap 88 has formed on opposite sides thereof a pair of switch mounting plates 92 and 93. The plate 92 has attached adjacent the upper end thereof an upper limit microswitch which is actuated when a cam 95 on the guide shaft 79 engages a lever arm on the microswitch 94 in a raised position of the guide shafts 79 and 81. The plate 92 also has attached adjacent the lower end thereof a lower limit microswitch 96 which is actuated when the cam 95 engages the lever arm on the microswitch 96 in a lowered position of the guide shafts 79 and 81. If the microswitches are connected between a power supply (not shown) and the gear motor 44 of the film supply station 32 such that when the microswitch 96 is actuated, the gear motor is turned on and, when the microswitch 94 is actuated, the gear motor will be turned off, the movement of the guide shafts and the roller 37 will control the feeding of this strip of film through the film feed station 33. For example, if the guide shafts 79 and 81 are in the lower position, the microswitch 96 will be actuated to turn on the gear motor 44. The gear motor circuit may include a latching relay (not shown) which will maintain power to the motor as the guide shafts rise toward the raised position. The gear motor 44 will turn the supply reel 66 to unwind the strip of film 36. As the film 36 unwinds, the guide shafts 79 and 81 and the roller 37 will move upwardly pulling the unwound film into the film feed station until the cam 95 actuates the microswitch 94 to turn off the gear motor. When the gear motor turns off there will have been drawn into the film feed station 33 a predetermined length of film equal to twice the distance between the lowered and raised positions of the film feed roller 37. The film is then drawn from the film feed station 33 by the film metering station 34 in segments equal in length to the master microfiche thereby forcing down the guide shafts 79 and 81 and the roller 37. The gear motor circuit may include a latching relay (not shown) which will prevent power from reaching the gear motor as the guide shafts descend toward the lowered position where the cam 95 actuates the microswitch 96 to start the cycle again.

The plate 93 has attached thereto a microswitch 97 which senses the end of the strip of film 36 as it passes through the film feed station 33. When the end of the strip of film 36 leaves the supply reel 66, the downward force on the roller 37 will be released. The helical springs will force the guide shafts upwardly past the upper limit microswitch 94 until the cam 95 engages the lever arm of the microswitch 97 to actuate the microswitch. The microswitch 97 may be connected between a power supply (not shown) and an indicator lamp (also not shown) such that the indicator lamp is illuminated when the microswitch is actuated.

The cam 95 and a cushion 98 are formed with an aperture in the centers thereof through which the lower end of the guide shaft 79 is inserted. A cap screw 99 is threaded onto the lower end of the guide shaft 79 and has a head which is of a larger diameter than the diameter of the aperture in the cam 95 for retaining the cam on the guide shaft 79. The cushion acts as a shock absorber between the cam 95 and the end cap 88 when the guide shaft reaches its fully raised position as the end of the film 36 is sensed.

In summary, the film feed station 33 senses the need for more film and in response thereto actuates a gear motor 44 to supply a predetermined length of film from the supply reel 66. Therefore, the film feed station 33 functions as a buffer between the film supply station 2 and the film metering station 34 whereby the metering station 34 draws film against the spring force of the film feed station rather than against the inertia of the film supply reel 66 were it not motor driven. The film feed station 33 also senses the end of the strip of film 36 as it leaves the supply reel 66 and lights an end of film indicator lamp.

Referring to FIG. 6, there is shown a film metering station 34 in a cross-sectional view taken along the line 6—6 of FIG. 2. As shown in FIG. 2, the strip of film 36 exits from the film feed station 34 around the underside of the roller 73 and enters the film metering staton 34. The film 36 travels through the metering station 34 around the upperside of the metering roller 101 and around the underside of a guide roller 102 where it exits adjacent the film exposure station 35.

Referring to FIGS. 2, 3 and 6, the metering roller 101 is formed with a shaft extension at either end thereof. These shaft extensions are received in a pair of ball bearings 103 and 104 which are press fitted into the mounting brackets 74 and 75 respectively. Each of the shaft extensions has formed therein a groove such that the distance between the grooves is slightly greater than the distance between the outside surfaces of the ball bearings 103 and 104. Each of the grooves receives a C-shaped retaining ring which prevents movement of the metering roller 101 in a direction parallel to its axis. The outer surface of the metering roller 101 is covered with an anti-static neoprene material to provide a frictionally gripping surface so that there will be no slippage between the film 36 and the metering roller 101 as the film is drawn through the film metering station 34.

The guide roller 102 is rotatably mounted on a shaft the opposite ends of which are inserted in apertures in the mounting brackets 74 and 75. The ends of the shaft are retained in the mounting bracket apertures by axially located set screws 105 threaded into the mounting brackets for frictionally engaging the outer surface of the shaft so that the roller 102 is free to rotate on the shaft as the strip of film 36 is drawn through the film metering station 34. A pair of guides 106 are formed on opposite ends of the guide roller 102 to define the edges of a path of travel for the strip of film 36 as it enters the film exposure station 35. The guide roller 102, in cooperation with a guide roller positioned at the exit point of the film exposure station, aligns the film with the master microfiche in the film exposure station 35 in a direction perpendicular to the direction of travel of the strip of film 36.

The metering roller 101 is located between and above the roller 73 and the guide roller 102 such that the strip of film 36 contacts approximately one-half of the surface of the metering roller 101. The strip of film 36 is held at one end by the application of the magnetic brake of the gear motor 44 of the film supply station 32. The opposite end of the strip of film 36 is drawn from the film exposure station 35 as will be discussed below. As the film is drawn, the metering roller 101 will be rotated. Since there is no slippage between the film and the metering roller 101, the rotation of the metering roller 101 can be utilized to measure the amount of film drawn into the film exposure station 35. Typically, the circumference of the metering roller 101 will be equal to the length of the master microfiche so that when the completion of one revolution of the metering roller 101 is detected, the drawing of the film will be stopped and the correct length of the unexposed film will have been positioned in the film exposure station.

One shaft extension of the metering roller 101 extends through the mounting brackets 74 and has a cam 107 attached thereto for rotary movement with the roller 101. A microswitch 108 is attached to the mounting bracket 74 adjacent the cam 107 whereby an eccentric formed on the peripheral edge of the cam 107 engages a lever arm to actuate the microswitch 108 once each revolution of the metering roller 101. The microswitch 108 may be utilized to turn off the drawing mechanism after the correct length of unexposed film has been drawn into the film exposure station. A cover plate 109, shown in phantom, may be attached to the upper surface of the base plate 31 to protect the microswitch from dust and dirt which could interfere with its operation.

Figure 7:
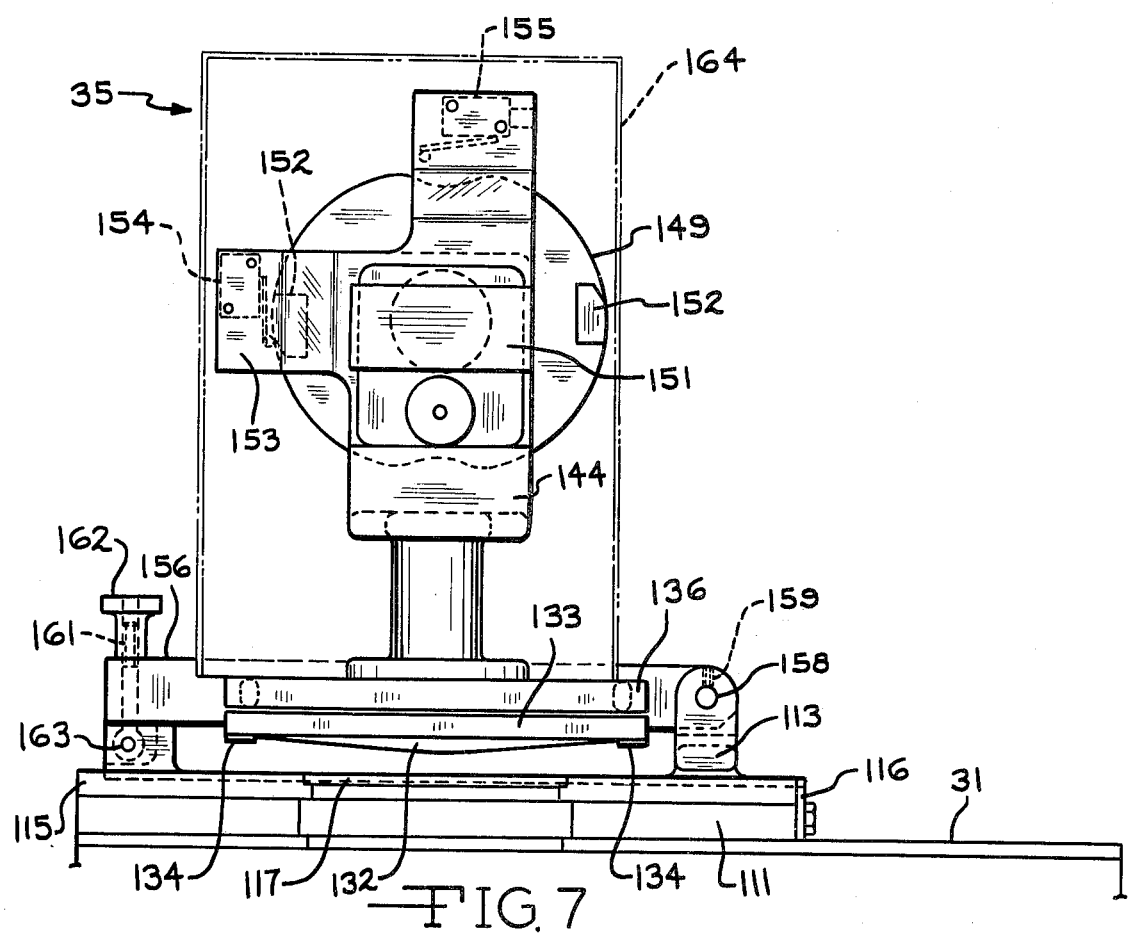
FIG. 7 is a cross-sectional view of the film exposure station of FIG. 2 taken along the line 7—7.

FIG. 7 shown in a cross-sectional view, taken along the line 7—7 of FIG. 2, the film exposure station. Referring to FIGS. 2, 3 and 7, an exposure slide spacer plate 111 is attached to the base plate 31 by any suitable means such as socket head screws 112 which are counter sunk below the upper surface of the plate 111. The plate 111 has an aperture formed therein which is aligned with an aperture formed in the base plate 31 whereby radiation from a light source (not shown) mounted below the plate 31 will illuminate a master microfiche and the unexposed film positioned on the upper surface of the plate 111. As shown in FIGS. 2 and 3, there is attached to the edge of the spacer plate 111, adjacent the film metering station 34, a spacer guide 113 and attached to the edge opposite the film metering station 34, a spacer guide 114. Each of the spacer guides 113 and 114 has a lip formed on the upper edge surface thereof which overhangs the upper surface of the spacer plate 111. These lips prevent vertical movement of a slide plate 115 which is free to move in the horizontal plane in a direction perpendicular to the path of travel of the strip of film 36. The slide plate 115 has an aperture therein near the front edge for use as a hand grip to facilitate movement of the plate. A slide stop 116 is attached to the rear edge of the spacer plate and extends above the upper surface thereof to prevent movement of the slide plate 115 beyond that point. The slide plate 115 has formed therein an aperture which is aligned with the apertures in the base plate 31 and the spacer plate 111 when the slide plate 115 is resting against the slide stop 116. The aperture in the slide plate 115 is covered by a clear quartz plate 117 to provide a support surface for the master microfiche and a window for the radiation from the light source (not shown) located below the base plate 31. Referring to FIG. 8, there is shown in a cross-sectional view taken along line 8—8 of FIG. 2, the slide plate 115 and the clear quartz plate 117. When the slide plate 115 has been pulled out of the film exposure station 35 such that the rear edge of the quartz plate 117 is positioned near the front edge of the spacer plate 111, a master microfiche 118 may be placed on the upper surface of the quartz plate. The master microfiche is held in position by front retainers 119 and 121 and by a rear retainer 122.

As shown in FIG. 9, a cross-sectional view taken along the line 9—9 of FIG. 8, each front retainer includes a front guide retainer 123 on top, a front fiche retainer 124 in the middle and a front guide spacer 125 on the bottom attached to the upper surface of the slide plate 115 by any suitable means such as flat head screws 126 which are countersunk below the upper surface of the front guide retainer 123. The guide retainers 123 and the guide spacers 125 are similar in that each is formed with the corner closest the quartz plate 117 removed. The fiche retainers 124 are sandwiched between the guide retainer 123 and the spacer 125 and have a corresponding corner removed to form lips which overhang the master mirofiche 118 at the front corners thereof to retain it in place. The rear retainer 122 includes a rear guide retainer 127 on top, a rear fiche retainer 128 in the middle and a rear guide spacer 129 on the bottom which are attached to the upper surface of the slide plate 115 by any suitable means such as flat head screws 131 which are countersunk below the upper surface of the rear guide retainer 127. The guide retainer 127, the fiche retainer 128 and the guide spacer 129 extend along the rear edge of the master microfiche 118. The fiche retainer 128 overhangs the front edge of the guide spacer to form a lip for retaining the microfiche 118, the rear edge of which abuts the front edge of the guide spacer 129. Therefore, the microfiche 118 is retained against the upper surface of the quartz plate 117 by the front fiche retainer 124 and the rear fiche retainer 128.

When the slide plate 115 is in the forward position, the master microfiche may be inserted by placing its rear edge under the lip formed by the rear fiche retainer 128 and bowing the microfiche until its front corners can be placed under the lips formed by the front fiche retainer 124. The master microfiche may be removed by bowing it until its front corners are free and then pulling the rear edge from under the lip formed by the rear fiche retainer 128.

Referring to FIGS. 2, 3 and 7, the strip of film 36 passes over the quartz plate 117 and the retained microfiche 118. There is positioned above the strip of film 36 a pressure platen air bag 132 which is inflated to press the strip of film against the master microfiche 118 and to press both against the upper surface of the quartz plate 117 during the time the film and the microfiche are being exposed to radiation from the light source (not shown). The air bag 132 is attached to the underside of a pressure platen 133 and is sealed around its edges by mounting strips 134. The pressure platen is threadably engaged by a pair of shafts 135 which extend upwardly through the apertures in a platen drive mounting plate 136. The opposite ends of the shafts are threaded for receiving a nut 137 and the shafts extend through the center of helical springs 138. The springs 138 are trapped between the nuts 137 and the upper surface of the platen drive mounting plate 136 and are compressed to exert upward pressure tending to raise the pressure platen 133 and the air bag 132 away from the upper surface of the strip of film 36.

A circular spacer block 139 is attached to the upper surface of the pressure platen by any suitable means such as socket head screws 141 counter sunk below the upper surface of the spacer block. The spacer block has an aperture formed in the center thereof for receiving one end of the platen shaft 142. A roll pin 143 engages the end of the platen shaft 142 and the spacer block 139 to connect them. The spacer block is inserted into a corresponding aperture in the mounting plate 136 when the pressure platen is in the raised position. A "Y" shaped drive mounting bracket 144 is attached to the platen drive mounting bracket with its stem positioned over the aperture which received the spacer block 139. A pair of sleeve ball bearings 145 are press fitted into the hollow center of the stem for slidably receiving the platen shaft 142. The upper end of the platen shaft 142 has a diametric slot formed therein for receiving a ball bearing 146. The ball bearing 146 is rotatably mounted on a roll pin which engages the platen shaft 142.

A ball bearing 147 is press fitted into the upper ends of each of the arms of the mounting bracket 144 for receiving opposite ends of a platen cam shaft 148. A cam 149 is attached to the enlarged center portion of the cam shaft 148 for rotation therewith. The peripheral edge of the cam 149 engages the peripheral edge of the ball bearing 146 so that when either one of two eccentrics on a cam 149 is adjacent the ball bearing 146, the drive shaft 142 and the platen drive mounting plate are forced downwardly so that the air bag 132 engages the strip of film 36. A magnetic brake gear motor 151 is attached to one arm of a drive mounting bracket 144 and is connected in a driving relationship with the platen cam shaft 148 to rotate the cam 149.

A pair of switch actuators 152 are attached to one face of the cam near the peripheral edge thereof at diametrically opposed locations on the apexes of the eccentrics. A switch mounting plate 153 is attached to the same arm of the drive mounting bracket 144 as is the gear motor 151. A microswitch 154 is attached to the switch plate 153 and has an actuating arm for engaging the switch actuators 152. A microswitch 155 is also attached to the switch plate 153 and has an actuating arm for engaging the switch actuators 152. The microswitch 154 is mounted 90° away and the microswitch 155 is mounted 180° away from the upper end of the platen shaft 142 along the path of travel of the actuators 152. Therefore, when one eccentric of the cam 149 engages the platen shaft 142 to lower the air bag 132, the switch actuator located at the other eccentric is actuating the microswitch 155. The microswitch 155 may be connected to turn on the light source to expose the strip of film 36 since the air bag 132 will have pressed the strip of film and the master microfiche together against the clear quartz plate. Furthermore, when the air bag 132 is in the raised position, one of the switch actuators is actuating the microswitch 154. The microswitch 154 may be connected to actuate the film drawing mechanism which draws the film through the film metering station 34 and the film exposure station 35.

A pair of swing arms 156 and 157 are attached one at either side edge of the platen drive mounting plate 136. The rear end of each of the swing arms 156 and 157 is received in a slot formed in an upstanding boss formed on the upper side near the rear end of the spacer guides 113 and 114. The swing arms are rotatably attached to the bosses by roll pins 158 which are fixedly attached to the bosses by set screws 159 threaded into the bosses and engaging the roll pins 158. Therefore, the platen drive mounting plate 136 and the attached air bag driving mechanism may be rotated about the roll pins 158 by lifting the front ends of swing arms 156 and 157 to expose the slide plate 115 and the clear quartz plate 117.

When the swing arms 156 and 157 are in the lower position, a vertical slot formed in the front end of each swing arm engages an upstanding swing eye bolt 161. The threaded end of each swing eye bolt 161 extends above the upper surface of the associated swing arm and is engaged by knurled thumb nut 162. The lower end of each swing eye bolt is received in a slot formed in the front end and upper surface of a boss formed near the front end of each of the spacer guides 113 and 114. The swing eye bolts are rotatably retained in the slots by roll pins 163. When the thumb nuts 162 are tightened down, the swing arms are trapped between the bottom surface of the thumb nut and the upper surface of the eye bolt retaining boss. When it is desired to raise the front end of the platen drive mounting plate 136, the thumb nuts are loosened and the swing eye bolts are rotated forwardly about the roll pins until they are disengaged from the slotted swing arms.

In summary, a segment of unexposed film of a length determined by the film metering station 34, is drawn into the film exposure station 35. The slide plate 115 is pulled out from the front of the exposure station and the master microfiche 118 is positioned over the clear quartz plate 117. The slide plate 115 is then pushed into the exposure station against the slide stop 116. The gear motor 151 is actuated to rotate the cam 149 which depresses the air bag 132. The air bag 132 presses the unexposed film against the master microfiche and both against the quartz plate. Simultaneously, one of the switch actuators 152 on the cam 149 actuates the microswitch 155 which turns on a light source located below the quartz plate to expose the film. The cam 149 is then rotated to release the air bag 132 and actuate the microswitch 154 which turns on the drawing mechanism to draw another segment of unexposed film into the film exposure station and draw the exposed film into the developing module. The film exposure station air bag driving mechanism may be shielded by a cover 164, shown in phantom, which is attached to the upper surface of the platen drive mounting plate 136.

The continuous strip of film 36 exits the film exposure station 35 adjacent the silver film module. The strip of film passes over a guide roller 165 which co-operates with the guide roller 102 of the film metering station 34 to maintain the strip of film in position as it passes through the film exposure station 35. The guide roller 165 is rotatably mounted on a shaft 166 the opposite ends of which are inserted in apertures in a pair of mounting brackets 167 formed on the spacer guide 114. The ends of the shaft are retained in the mounting bracket apertures by axially located set screws 168 threaded into the mounting brackets for frictionally engaging the outer surface of the shaft 166 so that the roller 165 is free to rotate on the shaft as the strip of film 36 is drawn out of the film exposure station. A pair of guides 169 are formed on opposite ends of the guide roller 165 to define the edges of a path of travel for the strip of film as it exits the film exposure station and enters the film developing module.

Figure 10:
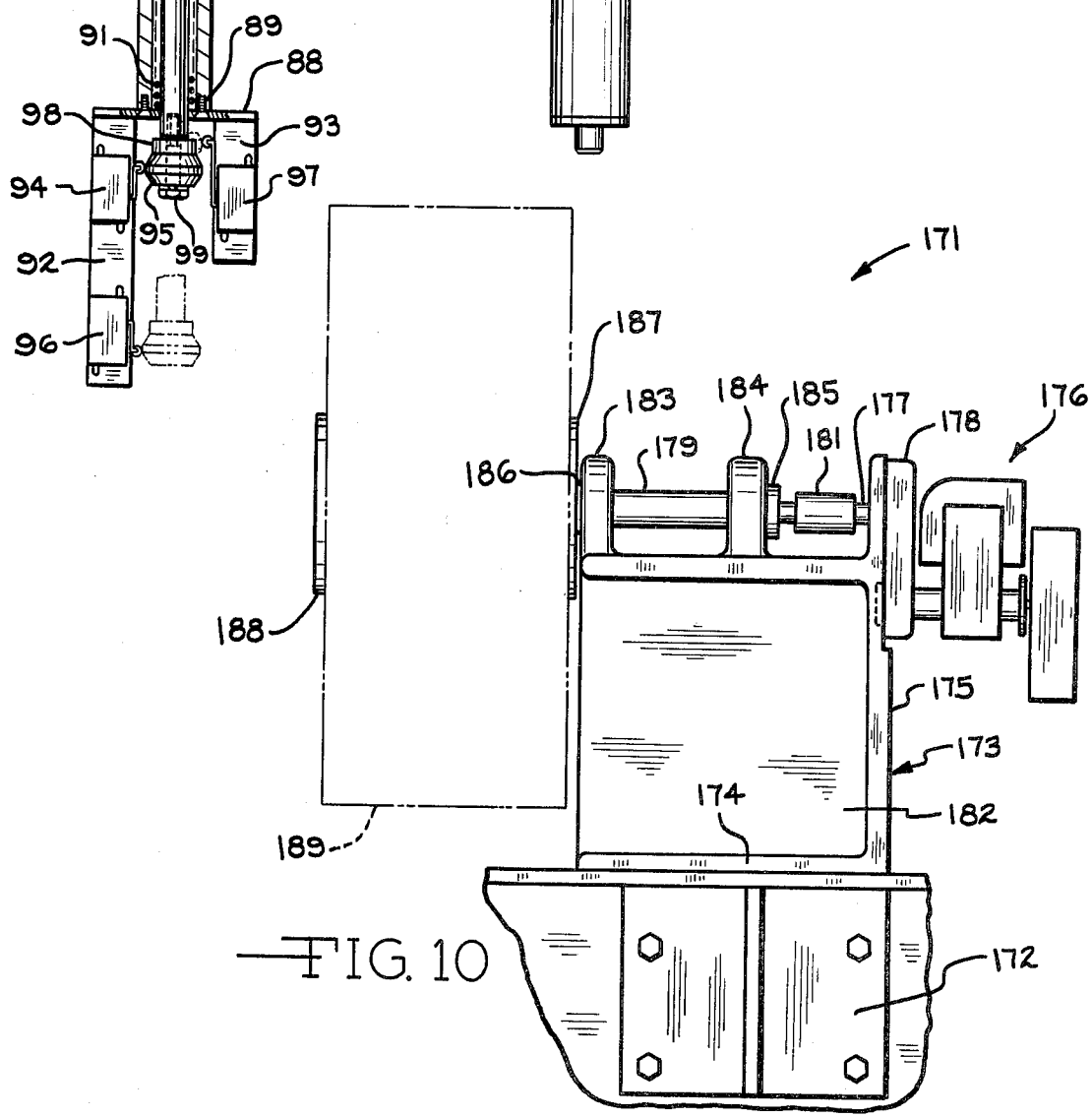
FIG. 10 is a side elevational view of the silver film advancing module according to the present invention.

Referring to FIG. 10, there is shown a side elevational view of the silver film advancing module according to the present invention. As shown in FIGS. 2, 3, and 10, a silver film module 171 includes a mounting bracket 172 which is attached to the side of the supporting framework for the base plate 31. The upper surface of the mounting bracket 172 has attached thereto a film collecting mechanism which is similar to the film supply station 32. A collecting reel mounting bracket 173 has a planar lower base 174 which may be attached to the mounting bracket 172 by any suitable means such as cap screws, lock washers and nuts as shown. There is formed along the rear edge of the lower base 174 a vertical planar plate 175 having a magnetic brake gear motor 176 attached to the rearward surface thereof. The gear motor 176 may be attached to the plate 175 by any suitable means such as cap screws and lock washers.

The gear motor 176 has an output shaft 177 which exits a gear case 178 and extends through an aperture in the plate 175. The output shaft 177 is connected to a driveshaft 179 by a sleeve coupling 181. The coupling has a longitudinal aperture formed therein for receiving one end of each of the output shaft 177 and the driveshaft 179 which are retained by a pair of axially threaded set screws.

There is also formed on the lower base 174 a vertical planar plate 182 which is attached to the plate 174 at right angles thereto. Formed on the upper edge of the plate 182 is a pair of bosses 183 and 184 which retain a pair of ball bearings (not shown). The driveshaft 179 is rotatably supported by the ball bearings and is restrained from axial movement therethrough. A bearing lock nut 185 threadably engages the driveshaft 179 adjacent the end connected to the coupling 181. A bearing lock washer (not shown) is trapped between the lock nut and the rearward surface of the bearing in the boss 184 to prevent forward movement of the driveshaft 179. A collar 186 formed on the driveshaft 179 is drawn against the forward surface of the bearing in the boss 183 when the lock nut 185 is tightened to prevent rearward movement of the driveshaft 179.

The forward end of the driveshaft 179 is inserted into an axial aperture in a rear film hub 187. A nut (not shown), similar to the nut 63 of FIG. 4, threadably engages the forward end of the driveshaft 179 and is tightened to trap a lock washer (not shown) and the film hub 187 against the collar 186 so that hub 187 rotates with the driveshaft 179. The forward end of the driveshaft 179 threadably receives a front film hub 188. The rear film hub 187 has a flange formed on its rearward edge and the front film hub 188 has a flange formed on its forward end for retaining a collecting reel of film 189, shown in phantom. The reel 189 has a hollow core into which the rear hub 187 is inserted until the reel 189 abuts the flange. Then the front hub 188 is inserted into the hollow core until its flange abuts the reel 189. The front hub 188 is provided with a pair of diametrically opposed longitudinal apertures 191 and 192 which serve as finger grips for inserting and removing the front film hub 188.

The gear motor 176 is actuated to turn the film collecting reel to draw the strip of film 36 from the film feed station 33, through the film metering station 34, through the film exposure station 35 and into the silver film module 171 in segments the length of which are determined by the film metering station 34. Each segment represents the length of a master microfiche which is to be duplicated. After all the film from the film supply station 32 has been collected on a reel 189, the reel is removed for further processing to develop the film.

In summary, the present invention is a modular apparatus for making one or more duplicates of a master microfiche. A basic processing module co-operates with a selected one of a plurality of film advancing modules each associated with a different type of microfilm. A selected film advancing module, which processes only one of the three aforementioned types of film, is individually attached to the basic processing module. Any additional film advancing modules may be individually purchased as needed and stored separately from the basic processing module and selected film advancing module which is in use at the time. The film advancing module draws a continuous strip of microfilm through the basic processing module which includes a film supply station, a film feed station, a film metering station and a film exposure station.

The film feed station has a motor driven, rotatably mounted reel of unexposed microfilm from which the continuous strip of microfilm is drawn. The film feed station draws the microfilm in increments of a predetermined maximum length. The film advancing module draws the continuous strip of film from the film feed station through the film metering station which measures out a segment of film equal in length to the master microfiche. Each measured segment of film enters the film exposure station where it is exposed to radiant energy in superposition with the master microfiche.

The strip of film passes over a feed roller in the film feed station mounted for vertical movement and spring biased to move upwardly. The film supply station motor has a magnetic brake which is actuated to hold one end of the film strip as each segment is drawn from the film feed station. The position of the microswitch actuating cam means mounted for movement with the feed roller indicates the length of the portion of the film strip in the film feed station by its distance from a first position at the lower end of the path of travel of the cam means. When there is a minimal predetermined length of the portion of the film strip in the film feed station, the feed roller will be forced downwardly and the cam means will actuate a first microswitch located at the first position to turn on the film supply station motor to supply film to the film feed station. The feed roller will move upwardly to draw the film strip into the feed station. If the end of the film strip is reached before the predetermined maximum length is drawn in, the feed roller will be free to move the cam means to a second position at the upper end of the path of travel to actuate a second microswitch which turns on an end of film indicator lamp. If the end of the film strip is not reached, the feed roller will move to move the cam means to a third position intermediate the first and second positions to actuate a third microswitch which stops the film supply station motor. The distance between the first and third positions along the path of travel of the cam means is equal to one half of the predetermined maximum length.

The film advancing module is actuated to draw the film strip from the film feed station through the film metering station and the film exposure station. The film metering station measures the strip of film and stops the drawing when a segment equal in length to the master microfiche has been drawn. Next, an air bag platen is moved downwardly to press together the unexposed film and the master microfiche which are exposed to radiant energy to form an image on the strip of film. The air bag platen is raised and the developing module is actuated to draw another segment of the strip of film.

The silver film advancing module includes a motor driven, rotatably mounted reel. The motor is actuated to draw the strip of film through the basic processing module and to wind it up on the reel. A magnetic brake may be actuated to hold the exposed end of the strip of film as the film feed station draws the predetermined maximum length from the film supply station.

Each film advancing module for a particular type of microfilm includes a mounting bracket similar to the mounting bracket 172 of the silver film module shown in the drawings. The mounting bracket is attached to the supporting framework for the base plate 31 by any suitable means which allow the module to be quickly attached to and detached from the basic processing module. Space for mounting any of the several film advancing modules is provided adjacent the basic processing module under the cover 13 in the cabinet 11 of FIG. 1. This feature of the present invention saves time when changing from one film type to another and provides the capability of processing and developing a plurality of different types of film with a lower investment in equipment. Each film advancing module includes drive means, such as the gear motor 176 of the silver film module, for drawing the film segments from the basic processing module and means for receiving the exposed segments such as the film reel 189.

In accordance with the provisions of the patent statutes, I have explained the principle and mode of operation of my invention and have illustrated and described what I now consider to represent its best embodiment. However, I desire to have it understood that the invention may be practiced otherwise than as specifically illustrated and described without departing from its spirit and scope.

What I claim is:

1. A modular microfiche duplicator comprising a basic processing module for exposing an unexposed segment of microfilm to duplicate a master microfiche and a film advancing module, separable from said basic processing module, for drawing said segment from said basic processing module and for receiving said segment, said basic processing module including:
   a film supply station, having a motor driven, rotatably mounted reel of unexposed microfilm, for supplying a continuous strip of unexposed microfilm upon which said segment is defined;
   a film exposure station for exposing said master microfiche and said segment in superposition to a source of radiant energy to define on said segment an image from said master microfiche;
   a film feed station intermediate said film supply station and said film exposure station having means for drawing a predetermined maximum length of said continuous strip of microfilm into said film feed station, means for indicating the length of the portion of said continuous strip of microfilm in said film feed station, and means responsive to said indicating means for turning on and off the motor driving said reel of said unexposed microfilm; and
   wherein said indicating means includes microswitch actuating cam means attached to said drawing means and movable along a predetermined path between first and second positions at the respective end points of said path wherein said drawing means is responsive to a predetermined minimum length of said portion of said continuous strip of microfilm to move said microswitch actuating cam means to said first position and wherein said indication responsive means includes a first microswitch, connected between the motor driving said reel of unexposed microfilm and a motor power source, located adjacent said first position for actuation by said microswitch actuating cam means to turn on the motor to supply said continuous strip of film to said film feed station.

2. A modular microfiche duplicator according to claim 1 wherein said drawing means is responsive to the absence of said continuous strip of microfilm to move said microswitch actuating cam means to said second position and wherein said indication responsive means includes a second microswitch located adjacent said second position for actuation by said microswitch actuating cam means to indicate the absence of said continuous strip of film.

3. A modular microfiche duplicator according to claim 1 wherein said drawing means is responsive to the presence of said predetermined maximum length of said portion of said continuous strip of unexposed microfilm in said film feed station to move said microswitch actuating cam means to a third position along said path intermediate said first and second positions and wherein said indication responsive means includes a second microswitch, connected between the motor driving said reel of unexposed microfilm and a motor power source, located adjacent said third position for actuation by said microswitch actuating cam means to turn off the motor to stop the supply of said continuous strip of film to said film feed station.

4. A modular microfiche duplicator comprising a basic processing module for exposing an unexposed segment of microfilm to duplicate a master microfiche and a film advancing module, separable from said basic processing module, for drawing said segment from said basic processing module and for receiving said segment, said basic processing module including:

a film supply station for supplying a continuous strip of unexposed microfilm upon which said segment is to be defined;

a film feed station having means for drawing a predetermined maximum length of said continuous strip of microfilm into said film feed station, said means for drawing being movable along a rectilinear path in one direction for drawing said predetermined maximum length of said continuous strip of microfilm into said film feed station and being movable along the rectilinear path in the opposite direction as said predetermined maximum length of said continuous strip of microfilm is drawn from said film feed station, and having means for moving said means for drawing in said one-direction; and wherein said means for drawing includes a film feed roller for frictionally engaging said continuous strip of microfilm, at least one guide rod attached to said film feed roller and mounted for movement along said rectilinear path, and a pair of rollers for defining the ends of the length of said continuous strip of microfilm in said film feed station and wherein said means for moving said means for drawing includes spring means biasing said film feed roller and said guide rod in said one direction to draw said predetermined maximum length of said continuous strip of microfilm into said film feed station.

* * * * *